US012716702B2

(12) United States Patent
Satkiewicz

(10) Patent No.: US 12,716,702 B2
(45) Date of Patent: Aug. 25, 2026

(54) ELECTROMECHANICAL MEASURING INSTRUMENT

(71) Applicant: Moodus Innovations LLC, Moodus, CT (US)

(72) Inventor: Edmund P. Satkiewicz, East Haddam, CT (US)

(73) Assignee: MOODUS INNOVATIONS LLC, Moodus, CT (US)

(*) Notice: Subject to any disclaimer, the term of this patent is extended or adjusted under 35 U.S.C. 154(b) by 419 days.

(21) Appl. No.: 18/450,372

(22) Filed: Aug. 15, 2023

(65) Prior Publication Data

US 2024/0053131 A1 Feb. 15, 2024

Related U.S. Application Data

(60) Provisional application No. 63/371,420, filed on Aug. 15, 2022.

(51) Int. Cl.
*G01B 3/38* (2006.01)

(52) U.S. Cl.
CPC .................................... *G01B 3/38* (2013.01)

(58) Field of Classification Search
CPC ... G01B 3/38; G01B 3/40; G01B 3/42; G01B 3/44
USPC .................................................. 33/783, 784
See application file for complete search history.

(56) References Cited

U.S. PATENT DOCUMENTS 2,447,612 A * 8/1948 Dowe ...................... G01B 3/20 33/501.06
3,113,384 A * 12/1963 Keszler .................... G01B 3/20 33/811
4,399,613 A * 8/1983 Nishikata ............... G01B 3/205 29/434
4,612,656 A * 9/1986 Suzuki ................... G01B 3/205 33/784
5,176,516 A * 1/1993 Koizumi ................ A61C 19/04 33/513
6,145,207 A * 11/2000 Brunson .................. G01B 3/40 33/784
6,223,136 B1 * 4/2001 Geiger ................... G01B 3/205 702/158
6,834,439 B2 * 12/2004 Matsumiya ............ B82Y 30/00 33/784

(Continued)

FOREIGN PATENT DOCUMENTS

JP 3183421 U * 5/2013 ............. G01B 3/002

*Primary Examiner* — George B Bennett
(74) *Attorney, Agent, or Firm* — Whitmyer IP Group LLC

(57) ABSTRACT

A digital caliper configured to partially fold for compactness, having an inner and outer pair of measuring jaws, as well as an extending member for measuring depth. The inner pair of measuring jaws may fold inward toward the caliper housing. The extending member for measuring depth is accessible by removing at least one of the jaws. The jaws may be easily replaced if damaged or to install a different jaw design to provide alternative functionality. A lever lock cam may lock the measurement position at any distance between measuring jaws. The caliper is shaped in such a manner that the device may be operable with one hand. The caliper contains a communications module which allows it to interface with a measurement application. The caliper may be programmed with any presets to provide measurement data in any specified depiction.

15 Claims, 28 Drawing Sheets

(56) References Cited

U.S. PATENT DOCUMENTS

| | | | | |
|---|---|---|---|---|
| 6,990,746 | B2 * | 1/2006 | Penna | G01B 3/205 33/783 |
| 7,802,374 | B1 * | 9/2010 | Chen | G01B 3/205 33/784 |
| 9,310,175 | B2 * | 4/2016 | Cook | G01B 3/002 |
| 9,631,912 | B2 * | 4/2017 | Saito | G01B 3/205 |
| 9,678,701 | B2 * | 6/2017 | Cook | G01B 3/205 |
| 9,689,652 | B2 * | 6/2017 | Jordil | G01B 21/047 |
| 10,184,772 | B2 * | 1/2019 | Kramarenko | G01B 3/20 |
| 11,474,623 | B1 * | 10/2022 | Chen | H02J 7/342 |
| 2016/0061574 | A1 * | 3/2016 | Saito | G01B 3/205 33/811 |

* cited by examiner

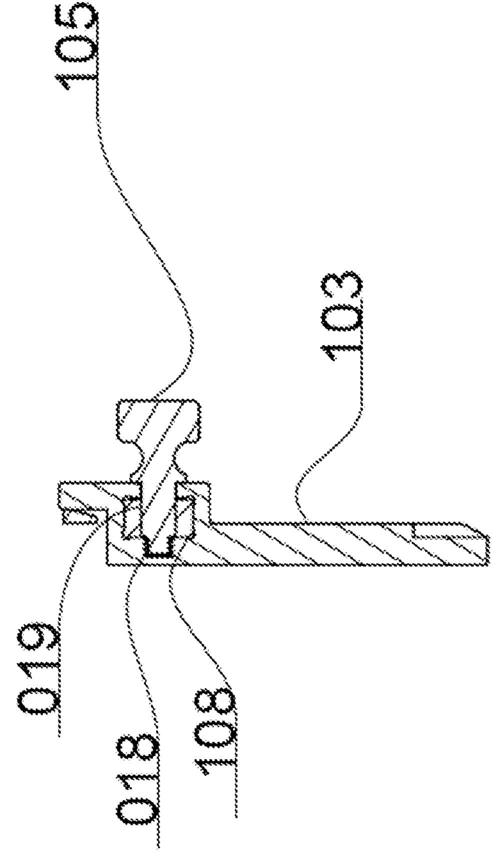
FIG. 19
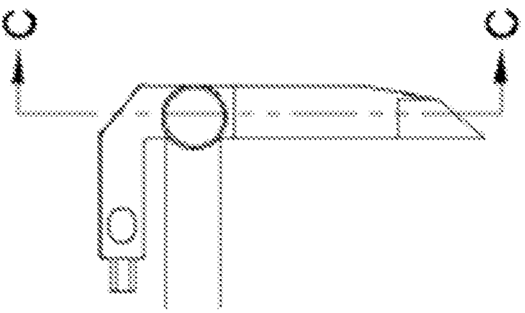

ELECTROMECHANICAL MEASURING INSTRUMENT

CROSS-REFERENCE TO RELATED APPLICATIONS

This application claims priority to U.S. Application No. 63/371,420 filed Aug. 15, 2022.

TECHNICAL FIELD

The disclosure relates generally to measuring devices. More specifically, the disclosure relates to improvements in utility and portability of electronic calipers.

BACKGROUND

Calipers are well known in the art and have existed for decades with only minimal advances in technology. They have a wide variety of personal and commercial uses pertaining to measurement.

The most simplistic calipers typically feature two sets of fixed jaws, one for measuring the inside dimensions of a component and another for measuring the outside dimensions of a component. Both sets of jaws are typically fixed relative to one another, such that the output measurement is identical for both. At least one jaw moves along a linear track in response to a linear force provided by an operator to measure the dimensions of a component. In known calipers, a jaw may be fixed to a sliding member on the linear track.

Traditional calipers are lengthy and cumbersome. The user is often required to grip the linear track itself while taking a measurement. This grip position becomes awkward when attempting to measure a component towards the caliper's outer limit, as the user may be left without a position for their hand. If that were the case, the user might be required to grip one or more of the jaws themselves. Utilizing calipers with one hand is difficult or impossible, given their length and changing center of mass.

Known calipers take measurements based on the position of a pinion gear fixed to a rack and pinion gear configurations. These configurations are susceptible to becoming jammed or inoperable when water, oil, or other unwanted debris gets between the rack and pinion gear.

Other, more modern measuring methods embodied in calipers are based on electronic sensors. These calipers utilize sensors based on capacitive or inductive measuring technology. While these electronic sensors may provide greater usability in wet or dirty conditions, they are often similar in size and operation to traditional rack and pinion configurations and thus suffer from similar inoperability in cramped spaces.

Calipers have some feature that allows a user to take measurements by reading the distance between the jaws or the depth of a depth meter. There are three main types of calipers known on the market, dial calipers, vernier calipers, and digital calipers. Previous calipers are known to utilize a mechanical dial for this purpose. In another design, a Vernier scale moves linearly relative to the track, which also includes a scale. More modern calipers are known to utilize an electronic display such as liquid crystal display (LCD) screens to display measurements.

Known calipers may also include a device for measuring the depth of a component. These depth markers are often in the form of a protruding member which is directly coupled to the rack and pinion or electronic measurement setup, thus allowing for a measurement to be read from the caliper in the same manner as a user would if they were utilizing the jaws of the caliper. Because these depth markers protrude outward from the caliper, they can make the caliper even lengthier and more awkward for the user. In some spaces, a protruding member might render the device completely useless.

To be more compact, known calipers simply reduce the physical dimensions of the measuring system, including the rack of the measuring rack and pinion gear system often referred to as the scale or main scale. These modifications reduce the useful measuring range of these calipers, since the pinion gear and rack setup are reduced. The same is true for calipers that take measurements using electronic sensing technology.

Known calipers incorporate a mechanism to lock the relative jaw position at any distance along the allowable travel length. This is commonly accomplished by tightening a thumb screw which clamps the rack. This design suffers from awkward, two-handed operation. In some scenarios, including spaces of limited access and operators having physical disabilities, use of this lock is impossible.

Many operators use the pointed jaw ends of calipers to scribe a marking onto a workpiece at a locked distance. In such an instance, the caliper is adjusted to a desired distance between the jaws and locked in place. One jaw may be moved adjacent to a surface while the pointed tip of the other jaw is dragged along a surface to mark it. After repeated markings, the jaw tips become dull, and the caliper can no longer be used for this purpose and also become less accurate for measuring towards the tips of the jaws.

As described above having sharp pointed ends on the jaws provides multifunction utility to known calipers. However, these point ends also offer the dual problem of being difficult to transport. The pointed ends create a dangerous point of contact that users must be careful of as well as a point of failure that may be damaged and requires additional protection. Known transportation methods and cases are large, bulky, and cumbersome and envelope the entire caliper.

The jaws of a traditional caliper are machined out of pieces which make up substantial portions of the device. The jaws, being precision surfaces, can be rendered useless if damaged. Since the jaws are so integrated into the design, the entire caliper must be replaced.

Furthermore, the integrated jaw design means that the functions of the caliper are fixed. Different jaw designs are better suited for different functions. In situations where a modified jaw design would be more practical, it is not easily accomplished. For example, when measuring the inside diameter of a hollow cylinder a rounded jaw would increase the accuracy of the measurement as compared to flat surface jaws.

Users also often need to convert measurements to a specific application: e.g., measuring diameter of a specific to drill bit size, measuring screw dimensions to thread size, or measuring O-ring sizes to name a few. In these situations, a user can use a caliper to find the dimensions of these part, however, a user would typically still need to refer to a lookup table or reference chart to find the standard part numbers.

Thus, there is a need for a compact caliper with replaceable jaws that makes use of electronic measuring systems.

SUMMARY

The needs set forth herein and other needs and advantages are addressed by the present embodiments, which illustrate solutions and advantages described below.

It is an object of the present teachings to remedy the above drawbacks and shortcomings associated with known calipers in the art.

It is an object of the present teachings to provide a caliper that is compact and affords improved utility and mobility to its users.

It is an object of the present teachings to provide a caliper having at least one pair of foldable measuring jaws for increased compactness depending on the user's needs.

It is an object of the present teachings to provide a caliper which allows for increased operability and mobility with only one hand.

It is an object of the present teachings to provide a caliper having a stretched coil induction sensor.

It is an object of the present teachings to provide a caliper which can accept a cap that may be used to protect its jaws and may be used as an extension of its housing.

It is an object of the present teachings to provide a caliper having a plurality of programmable electronic functions.

It is an object of the present teachings to provide a caliper having wireless communication capability to allow a user to program functions, view measurement data in real time, save measurement data, and/or perform updates as necessary.

It is an object of the present teachings to provide a caliper having the ability to wirelessly communicate with a mobile device for connection to an application.

It is an object of the present teachings to provide a caliper having a plurality of programmable preset settings for a wide variety of measurements and functions.

It is an object of the present teachings to provide a caliper having a cam lever for locking the caliper at any position with one handed operation.

It is an object of the present teachings to provide a caliper having removable, replaceable, or upgradeable jaws while maintaining specified precision.

It is an object of the present teachings to provide a caliper with a constant spring force for ease of use.

In an embodiment, these and other objects of the present teachings are achieved by providing a digital caliper configured to fold for compactness, having at least an inner and outer pair of measuring jaws that may fold, as well as an extending member for measuring depth. In an embodiment, the inner pair of measuring jaws fold inward toward the caliper housing. In an embodiment, the outer pair of measuring jaws does not fold. In an embodiment, the extending member for measuring depth is accessible by removing at least one of the jaws. In an embodiment, the caliper is shaped in such a manner that the device may be operable with one hand. In an embodiment, the caliper contains a communication module which allows it to interface with a measurement application. In an embodiment, the caliper position may be locked by actuating a lever with a cam feature on one end. In an embodiment, both sets of jaws may be removed to be serviced, replaced, or modified with alternative designs.

According to one aspect of the present teachings, the caliper contains two pairs of measuring jaws, the respective jaws of one such pair being capable of rotating for increased compactness.

The foregoing aspects and many of the attendant advantages of this invention will become more readily appreciated as the same become better understood by reference to the following detailed description, when taken in conjunction with the accompanying drawings.

BRIEF DESCRIPTION OF THE DRAWINGS

FIG. 19 is a cross section view of the upper jaws of an embodiment according to the present teachings.

DETAILED DESCRIPTION

The present teachings are described more fully hereinafter with reference to the accompanying drawings, in which the present embodiments are shown. The following description is presented for illustrative purposes only, and the present teachings should not be limited to these embodiments.

The present teachings have been described in language more or less specific as to structural and mechanical features. It is to be understood, however, that the present teachings are not limited to the specific features shown and described, since the device, apparatus, and/or system herein disclosed comprises preferred forms of putting the present teachings into effect.

For purposes of explanation and not limitation, specific details are set forth such as particular structures, architectures, interfaces, techniques, etc. in order to provide a thorough understanding. In other instances, detailed descriptions of well-known devices and/or methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The use of "first", "second," etc. for different features/components of the present disclosure are only intended to distinguish the features/components from other similar features/components and not to impart any order or hierarchy to the features/components.

Figure 1A:
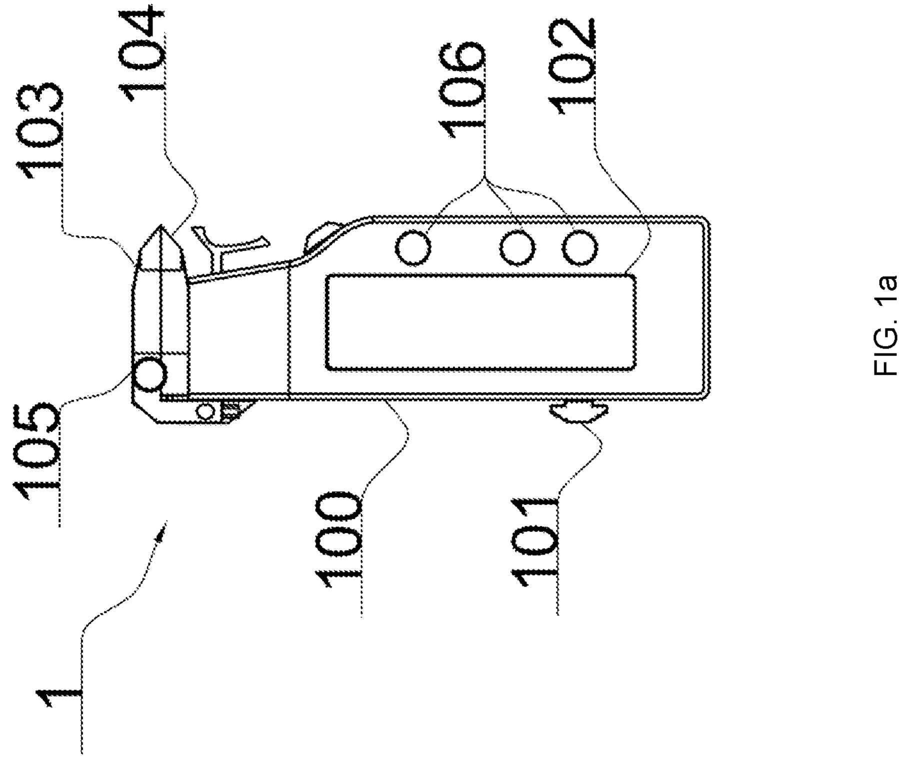
FIGS. 1*a*, 1*b*, and 1*c* are diagrams of an embodiment of a device according to the present teachings in retracted, extended, and depth gauge configurations, respectively.

FIG. 1*a* depicts an embodiment of a measuring device in a retracted position according to the present teachings.

A measuring device 1 according to the present teachings may implement or may be enclosed within a housing 100. The housing 100 may be made of composite, plastic, metal, or any other material or combination of materials suitable for use in construction or industrial environments. The housing 100 may partially or fully enclose some or all components of the measuring device 1 according to the present teachings.

The measuring device 1 may also have a thumb slider 101. The thumb slider 101 may be made of composite, plastic, metal, or any other material or combination of materials suitable for use in construction or industrial environments. The thumb slider 101 may be movably attached to a side of the housing 100. The thumb slider 101 may be positioned such that it may move linearly along an edge of the housing 100. While the thumb slider 101 is described in one orientation and one direction of motion it is understood that the thumb slider may be placed in any orientation along the housing 100 and/or have multiple degrees of movement or rotation. The thumb slider 101 may be coupled to an arm 108 (depicted in FIG. 1*c*) such that as the thumb slider 101 is moved the arm 108 is also moved.

The measuring device 1 may also have a graphical display 102 on a face of the housing 100. The graphical display 102 may comprise any suitable display technology including organic light emitting diodes ("OLEDs"), liquid crystal displays ("LCDs") or other digital displays. The graphical display 102 may be used to display measurements, instructions, prompts, or other information used in known calipers. The graphical display 102 may be on a side of the housing 100 adjacent to the thumb slider 101. It is understood that the graphical display 102 is one embodiment of the present teachings. The graphical display 102 may be any display used in known calipers including digital, analogue, dial, or other types of displays.

The measuring device 1 may also have an outer pair of jaws, which may comprise an upper outer jaw 103 and a lower outer jaw 104. The outer pair of jaws 103, 104 may be made of stainless steel, high carbon steel, or other rigid materials. The lower outer jaw 104 may be affixed to a side of the housing 100 and/or an internal structure. In an embodiment the lower outer jaw 104 may be affixed to a side adjacent to the thumb slide 101 and adjacent to the digital display 102. The upper outer jaw 103 may be positioned above the lower outer jaw 104 such that the lower outer jaw 104 is between the upper outer jaw 103 and the housing 100.

The upper jaw 103 may be releasably attached to the arm 108 by a thumb screw 105. The thumb screw 105 may be any suitable fastener including, screws, magnets, clamps, and rivets, capable of securing the upper jaw 103 to the arm 108. The opposite end of the arm 108 may be attached to the thumb slider 101.

The arm 108 may be constrained to the linear axis of motion by passing through a channel on the lower outer jaw 104 such that the orthogonality of the arm 108 and the lower outer jaw 104 are independent of the housing 100.

As the thumb slider 101 is moved in one direction the arm 108 and the upper outer jaw 103 may move in the same direction. Depending on the position of the thumb slider 101, the position of the upper outer jaw 103 may change such that the distance between the outer jaws 103, 104 changes. The graphical display 102 may display the distance between the outer jaws 103, 104 or other information regarding the position of the outer jaws 103, 104. The outer jaws 103, 104 may be used to measure the outside dimensions of an object.

The thumb screw 105 and the upper outer jaw 103 may be removed from the arm 108 such that the arm 108 may act as a depth gauge. The graphical display 102 may display the distance from an end of the arm 108 to the lower outer jaw 104 or other information regarding the positions of the arm 108 and the lower outer jaw 104.

The measuring device 1 may also have input buttons 106. The input buttons 106 may have preset functions or be programmable. The input buttons 106 may have a variety of functions and capabilities, including but not limited to, calibrating the measuring device 1, modifying the graphical display 102 (i.e., displayed units), uploading or downloading information, locking or unlocking the thumb slider 101, arm 108, or jaws, pausing or unpausing the measurement shown on the graphical display 102, modifying settings on the measuring device 1, or adjusting programmed presets on the measuring device 1. The input buttons 106 may be located on the same side of the housing 100 as the graphical display 102 or on any other side of the housing 100.

Figure 1B:
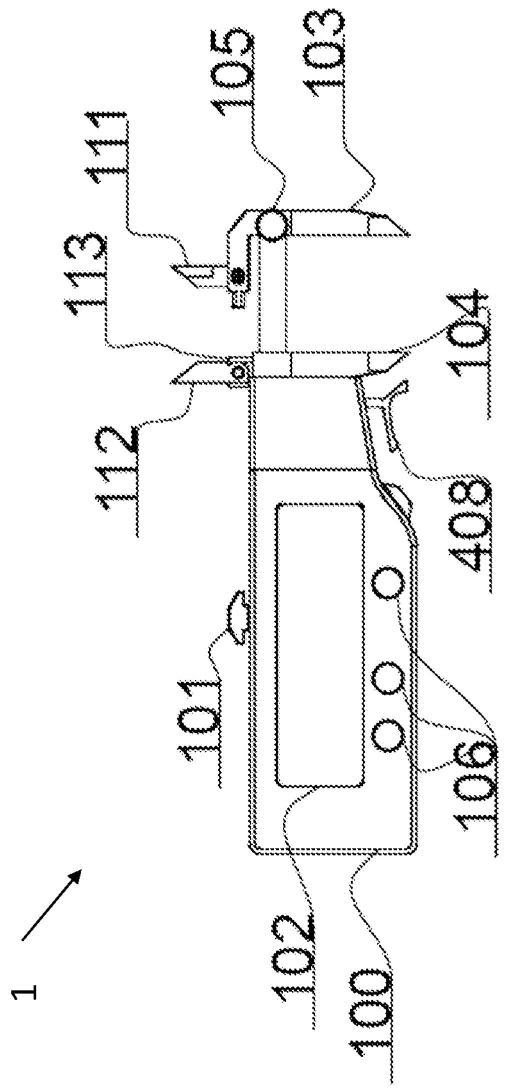

Referring now to FIG. 1*b*, depicted is an embodiment of a measuring device 1 in an extended position according to the present teachings. In the extended position, the arm 108 may be visible.

The measuring device 1 may also have an upper inner jaw 111 and a lower inner jaw 112. The upper inner jaw 111 may be attached to or a part of the same component as the upper outer jaw 103 and the lower inner jaw 112 may be attached to or a part of the same component as lower outer jaw 104. The inner jaws 111, 112 may be attached to the outer jaws 103, 104 via a screw, bolt, or other pivot point such that the inner jaws 111, 112 may rotate to be foldable. The inner jaws 111, 112 may be rotated from a storage position, parallel to the arm 108 and/or flush against the housing 100, to a measuring position, perpendicular to the arm 108 and/or the housing 100. The inner jaws 111, 112 may be used to measure the inside dimensions of an object.

The jaws may also have an upper shelf 107 (shown in FIG. 10) and a lower shelf 113. The upper shelf 107 may limit the axis of rotation of the upper inner jaw 111 and the lower shelf 113 may limit the axis of rotation of the lower inner jaw 112. The upper inner jaw 111 may rotate from the storage position to the measuring position whereby the upper inner jaw 111 rests against the upper shelf 107 and is perpendicular to the arm 108 and the housing 100. Similarly, the lower inner jaw 112 may rotate from the storage position to the measuring position whereby the lower inner jaw 112 rests against the lower shelf 113 and is perpendicular to the arm 108 and the housing 100. The shelfs 107, 113 may be precisely machined such that the inner jaws 111, 112 return to the same position every time the inner jaws 111, 112 are moved between the measuring and storage positions. When in the storage position the inner jaws 111, 112 may be more compact, easier to transport, and reduce the risk of damage to the jaws or any item which would come into contact with the jaws. The inner jaws 111, 112 are depicted in the storage position in FIG. 1*a* and in the measuring position in FIG. 1*b*.

Figure 1C:
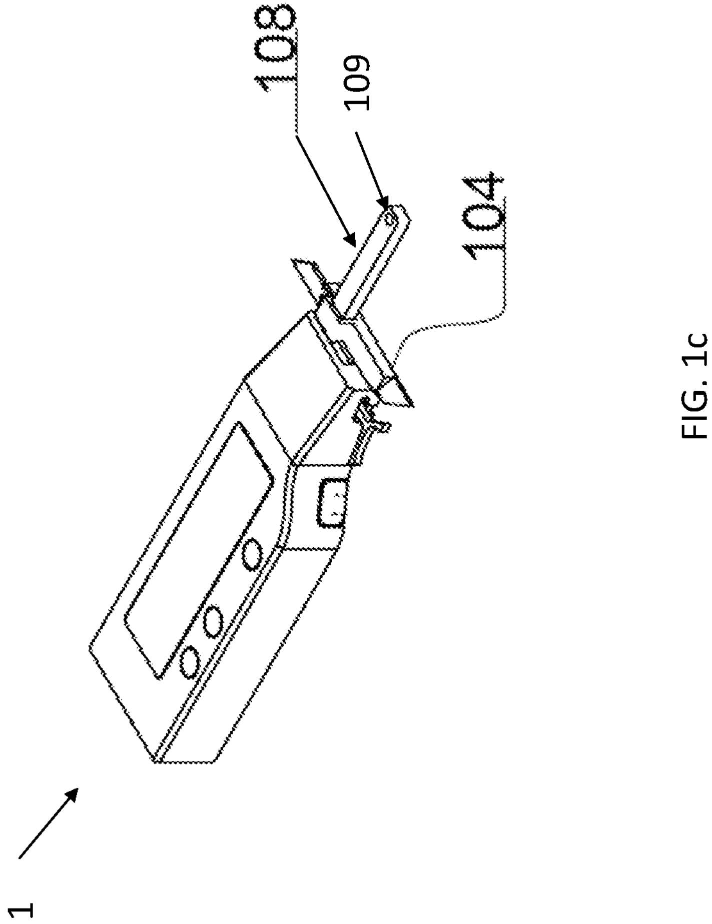

Referring now to FIG. 1*c*, depicted is an embodiment of a measuring device 1 in a depth gauge configuration according to the present teachings.

The upper jaw 110, comprising the upper outer jaw 103, the upper inner jaw 111, and the upper shelf 107, may be removed from the arm 108. A hole 109 or other connection point on the arm 108 may be exposed. The thumb screw 105 may secure the upper jaw 110, comprising the upper outer jaw 103 and the upper inner jaw 111, to the arm 108 via the hole 109. The thumb screw 105 may have a shoulder or other feature which provides precise and accurate alignment to the arm 108 each time it is reinstalled. When the upper jaw 110 is removed from the measuring device 1 the arm 108 may act as a depth gauge. The arm 108 may protrude from one end of the device extending away from the lower outer jaw 104. The measuring device 1 may measure and display the displacement of the arm 108 from the lower outer jaw 104.

Figure 2:
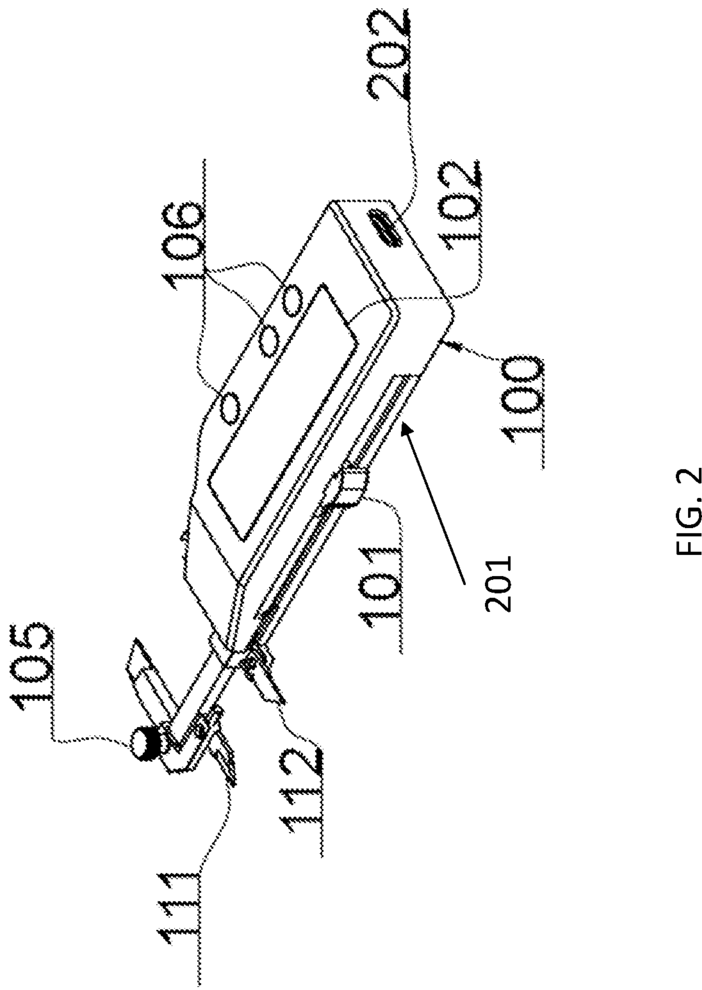
FIG. 2 is an orthographic projection of an embodiment of a device in a partially extended configuration according to the present teachings.

Referring now to FIG. 2, depicted is an embodiment of an isometric view of a measuring device 1 according to the present teachings. The measuring device 1 may also have a channel 201 in the housing 100. The channel 201 may be positioned in a manner to allow the thumb slider 101 and the arm 108 to move linearly along one side of the housing 100.

The measuring device 1 may also have one or more port(s) 202 present in housing 100 to send/receive data and/or connect to an external device. The port 202 may also be used to charge the measuring device 1. The port 202 may comprise any type of data connection and/or data transmission hardware, including USB-C, Mini-A, and Micro-A. In an embodiment, the port 202 may be on a side of the housing 100 adjacent to the channel 201, and opposite the lower outer jaw 104. However, it is understood that the port 202 may be on any side of the housing 100.

Figure 3:
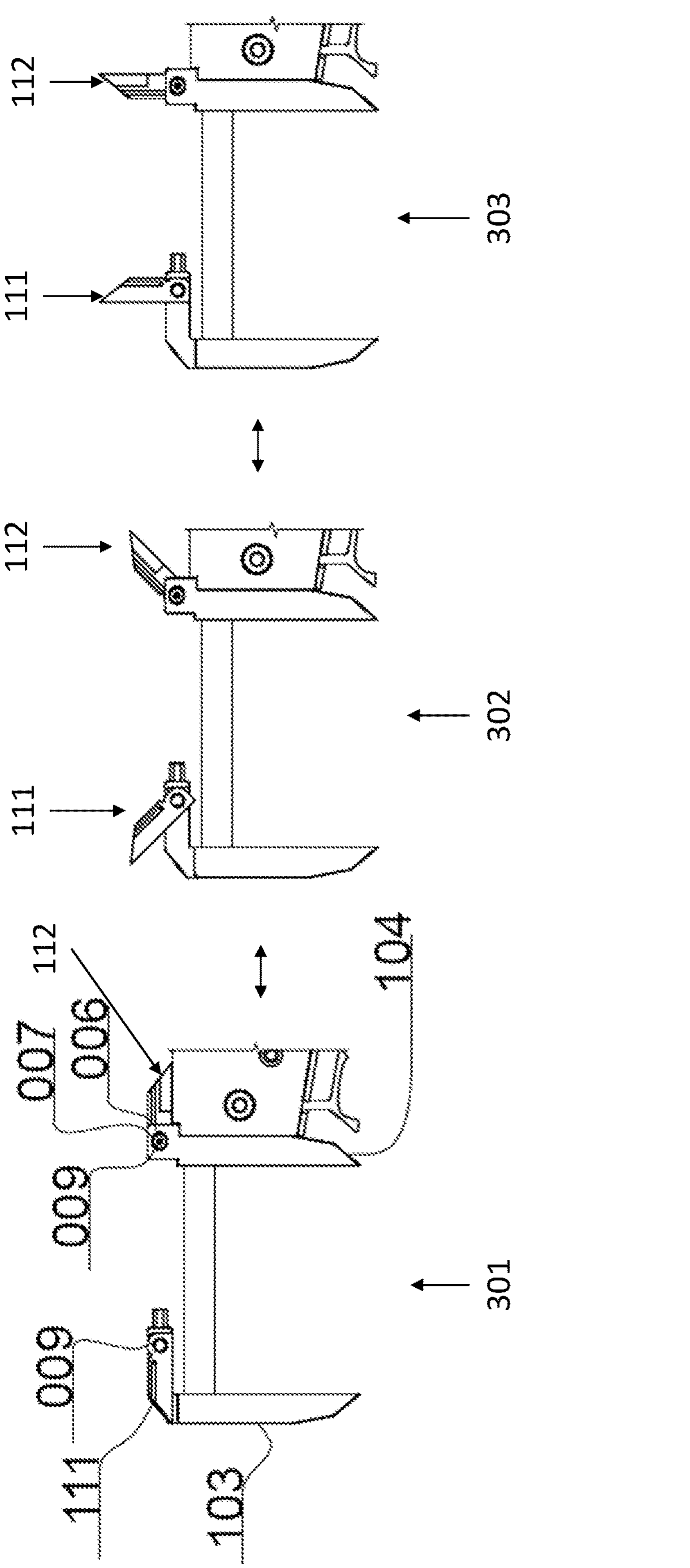
FIG. 3 is a close up view of inside and outside pairs of jaws of an embodiment of a device according to the present teachings.

Referring now to FIG. 3, depicted is a close-up view of the inner jaws 111, 112 transitioning from a storage position to a measuring position according to an embodiment of the present teachings.

FIG. 3 illustrates how the inner jaws 111, 112 may transition from the storage position 301 to the measuring position 303. In the storage position 301 (also seen in FIG. 1*a*), both jaws of the inner jaws 111, 112 may sit parallel with the arm 108. During rotation 302, the inner jaws 111, 112 may be in neither a storage position 301 nor the measuring position 303 transitioning between the two positions. In the measuring position 303 the inner jaws 111, 112 may be perpendicular to an arm 108 and rest against the shelfs 107, 113.

Figure 4A:
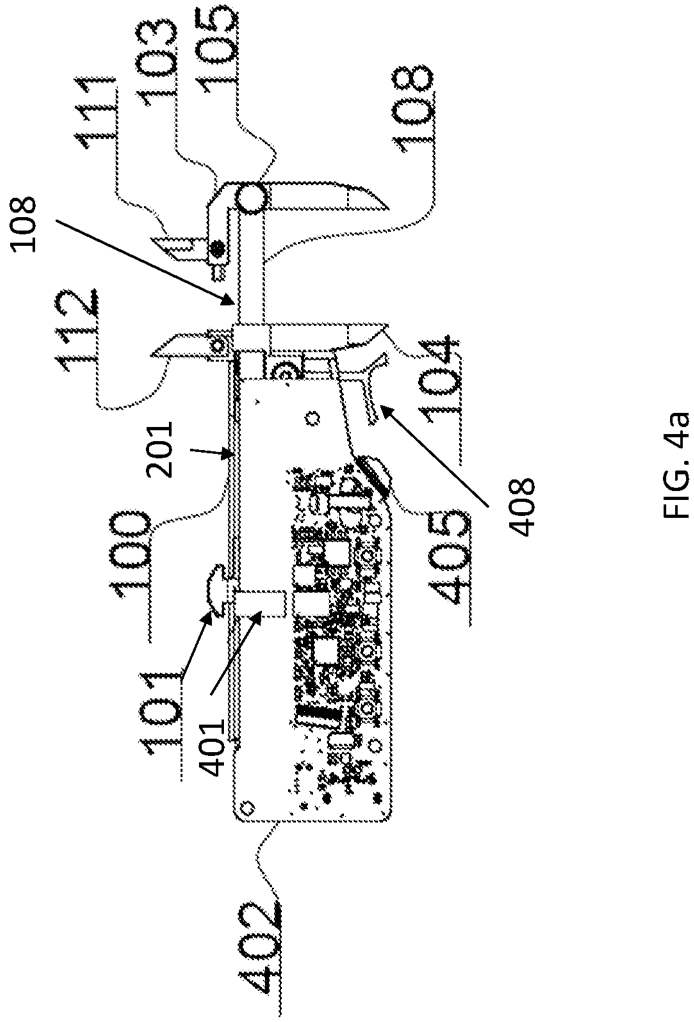
FIGS. 4*a* and 4*b* are diagrams of embodiments according to the present teachings showing the device housing cover removed and the device housing cover and internal PCB removed, respectively.

Referring now to FIG. 4*a*, depicted is an embodiment of an inside view of the measuring device 1 including a printed circuit board ("PCB"), according to the present teachings.

The thumb slider 101 may be attached to or a part of the same component as a linear bar 401. The linear bar 401 may sit perpendicular to the channel 201. When the thumb slider 101 is moved, the linear bar 401 may also move in the same direction as the thumb slider 101. In an embodiment, a linear bar 401 is parallel to the outer jaws 103, 104. A device according to the present teachings may also include a PCB 402, on which additional components may be mounted, such as a data module for powering the device, charging the battery 406, and/or for data communication. The data module 403 may be the same as the port 202 or a separate component.

The measuring device 1 may also include a wireless communication module which may be mounted on the PCB 402, under the PCB 402 on the housing 100 or any other location capable of housing the wireless communication module 404 on the device. The wireless communication module 404 may utilize Bluetooth and/or Wi-Fi as well as other wireless communication technology known in the art. Although the measuring device 1 may include a wireless communication module 404 it is understood that any type of wired or wireless communication technology is within the scope of the present disclosure. It is understood that the components mounted on the PCB 402 are non-limiting and are explained by way of example. Other components used on known calipers and measuring devices are within the scope of the present disclosure. Additionally, the placement of components on the PCB 402 are by way of example and the components may be in any position on the PCB 402.

Figure 4B:
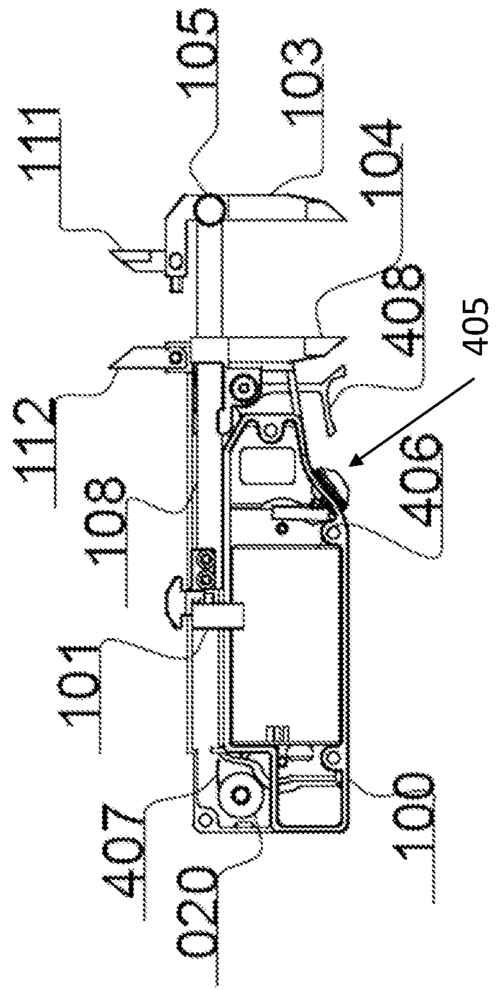

Referring now to FIG. 4*b*, depicted is an embodiment of an inside view of the measuring device 1 with the PCB 402 removed according to the present teachings.

The measuring device 1 may also include a programmable multi-function button 405. The programmable multi-function button 405 may be connected to the PCB 402 (shown in FIG. 4*a*). The programmable multi-function button 405 may be any switch, button, lever, touch sensor or other tactile connection. In an embodiment, programmable multi-function button 405 may be positioned of the device such that a user may operate the measuring device 1 including at least the thumb slider 101, programmable multi-function button 405, input buttons 106, and the cam lever lock 408 with one hand. The programmable multi-function button 405 may be programmable to meet user needs, preferences, or defaults.

In an embodiment the measuring device 1 may contain a battery 406. The battery 406 may be used to provide power to some or all components of a device according to the present teachings. Any materials of battery construction and/or operation are within the scope of the present disclosure.

In an embodiment the measuring device 1 may have a constant-force spring 407 or other method of jaw retention. A constant-force spring 407 may be coupled to the arm 108. The constant-force spring 407 may retain the outer jaws 103, 104, such that the outer jaws 103, 104 sit flush with one another in a resting state or while not actively being used for measurement. The constant-force spring 407 or other method of jaw retention may also retain the inner jaws 111, 112 such that the inner pair jaws 111, 112 sit flush with one another in a resting state or while not actively being used for measurement. Alternatively, the constant-force spring 407 may bias the jaws open/away from the opposing jaw in a resting state or while not actively being used for measurement. The constant force spring 407 also provides a consistent force which enhances measurement repeatability and reduces variance between operators and measurements.

Figure 5A:
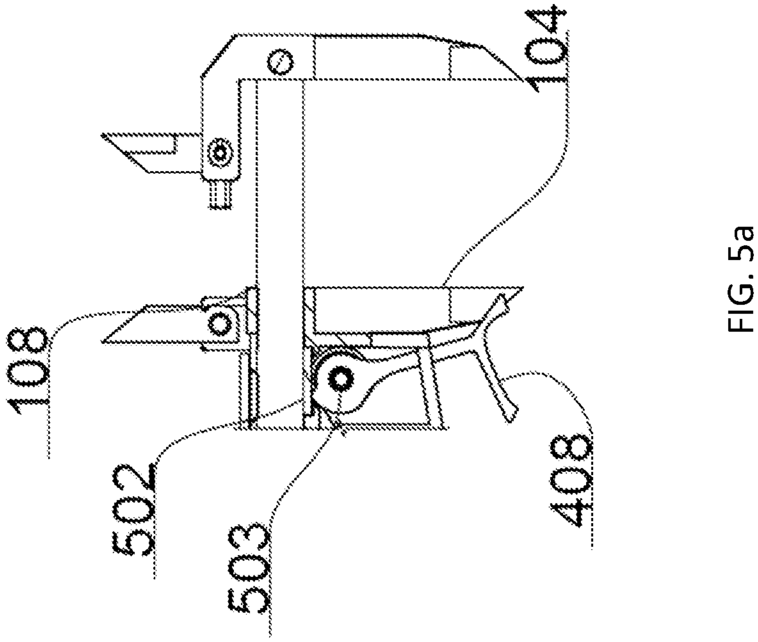
FIGS. 5*a* and 5*b* are close up views of the cam lever lock mechanism in a relaxed and an activated state according to an embodiment of a device according to the present teachings.
Figure 5B:
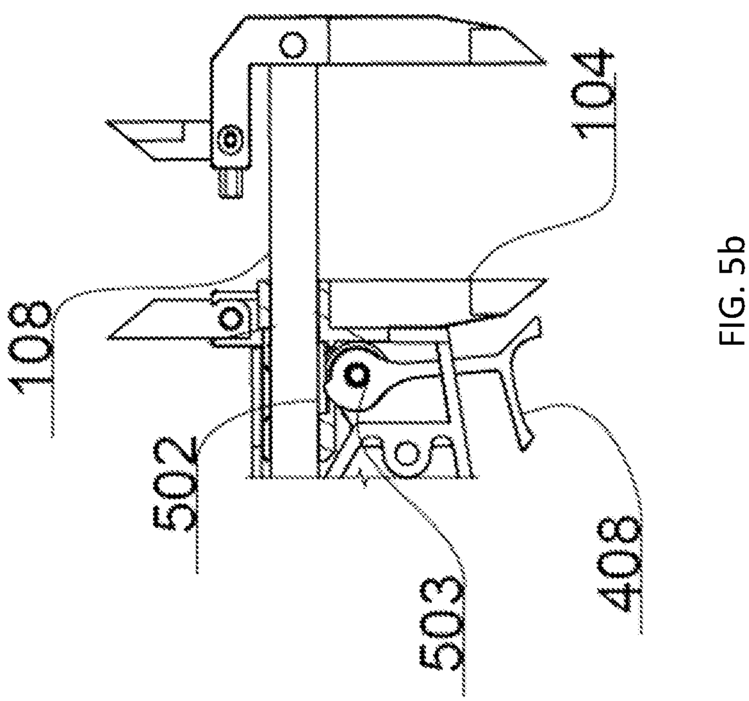

Referring now to FIGS. 5*a* and 5*b*, depicted are embodiments of the measuring device 1 according to the present teachings which exemplify the locking mechanism and the attachment method of the lower outside jaw 104.

A shoulder fastener 503 may be removed from the housing 100, opposite of the graphical display 102 (shown in FIG. 1*a*), to remove the lower outer jaw 104. The lower outer jaw 104 may be removed from the arm 108 by sliding the lower outer jaw 104 over the end of the arm 108 after the upper outer jaw 103 has been removed. The lower outer jaw

104 may therefore be replaced if damaged, or otherwise changed with a different form factor design to optimize for a specific measurement function.

The shoulder fastener 503 may be a shoulder screw, pin, or other fastener which secures the housing 100 to the lower outer jaw 104. A cam lever lock 408 may be installed on the fastener 503 such that it may rotate freely.

The lower outer jaw 104 may include a cavity or other structure which may contain a gib 502 constructed of some material which may induce frictional forces to movement on a body when a normal force is applied. The cam lever lock 408 may be rotated to move the gib 502 within the cavity of the lower outer jaw 104 and apply a normal force to the arm 108, and therefore locking the relative position of the upper and lower outside jaws 103, 104. The lock may be easily enabled or disabled with one hand.

In one embodiment, shown in FIG. 5*a*, the cam lever lock 408 may be rotated in a relaxed position whereby the gib 502 is not engaged within the cavity of the lower outer jaw 104 and does not apply a normal force to the arm 108. Additionally, as shown in FIG. 5*b* the cam lever lock 408 may be rotated in an engaged position whereby the gib 502 is engaged within the cavity of the lower outer jaw 104 and applies a normal force to the arm 108. In a preferred embodiment the cam lever lock 408 is biased to be in the relaxed position by default and/or the gib 502 is biased to not be engaged in the cavity of the lower outer jaw 104 to apply a normal force to the arm 108 by default.

Figure 6A:
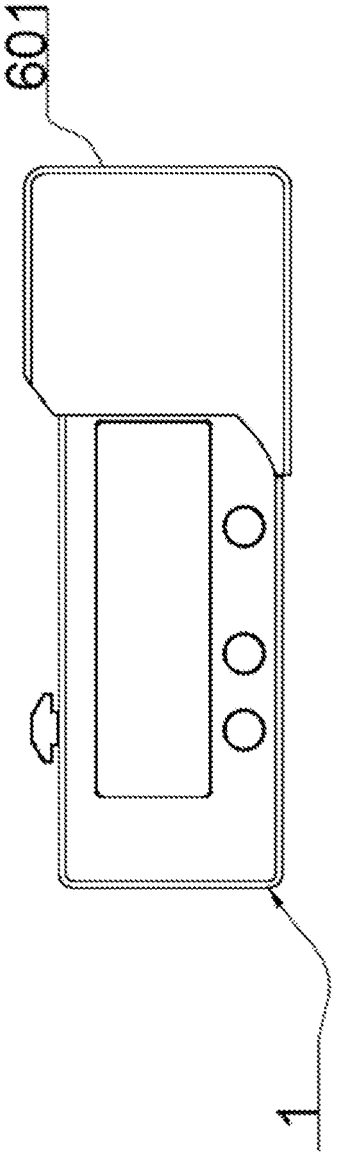
FIGS. 6*a* and 6*b* are diagrams of an embodiment of devices according to the present teachings with the end cap used as a cover and as a grip extension, respectively.
Figure 6B:
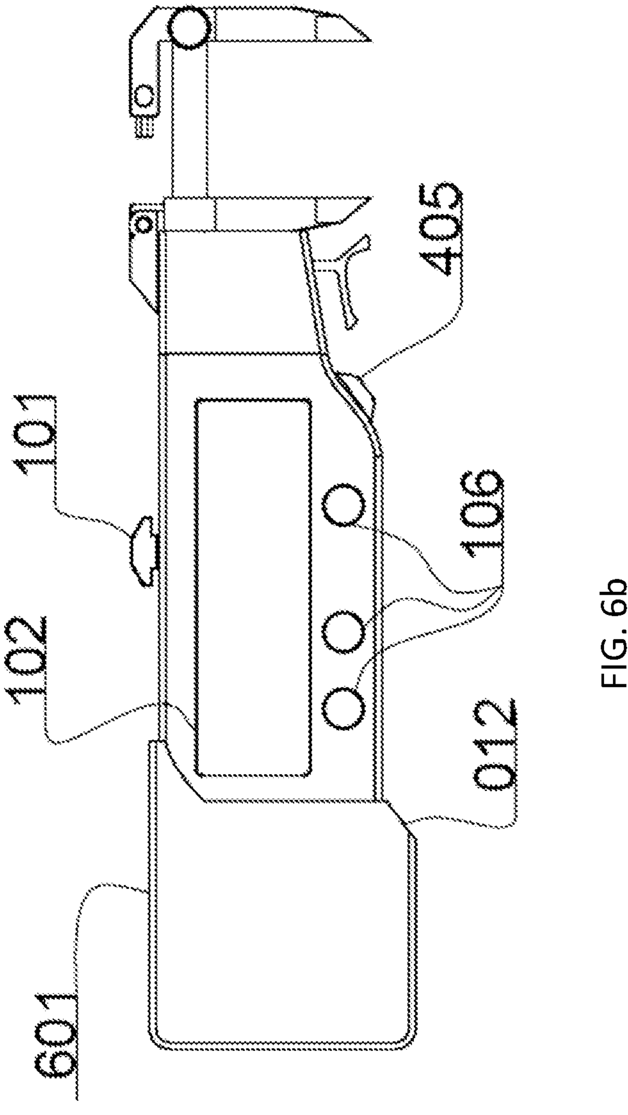

Referring now to FIGS. 6*a* and 6*b*, depicted is an embodiment of the measuring device 1 according to the present teachings that exemplifies the dual nature of end cap 601.

In FIG. 6*a*, the end cap 601 is used to cover both the inner jaws 111, 112 and the outer jaws 103, 104. The end cap 601 may have a retention feature which snaps the cap in place to prevent accidental dislodging, especially during transport. Depicted is a simple design for demonstration purposes, however it is understood that the end cap 601 may also include other features to optimize the transport of the measuring device 1 when not in use, such as a hole for a lanyard or key ring attachment, a belt or pocket clip attachment, or any other similar feature.

In FIG. 6*b*, the end cap 601 may be attached to the housing 100 as an extension of the measuring device 1, which may increase the ergonomics of the measuring device 1 by increasing the surface area of the housing 100 to allow a user to more easily hold it. Any physical configurations of an end cap 601 are within the scope of the disclosure, so long as an end cap 601 may be used to cover one or more pairs of jaws and/or may be used as an extension of a device according to the present teachings. The end cap 601 may also be used as an extension of the device such that a user may hold the end cap 601 to extend their reach and range of motion/measurement capabilities.

In a preferred embodiment the end cap 601 may also include an angled portion 012 to provide additional hand support and/or an ergonomic grip.

Figure 7A:
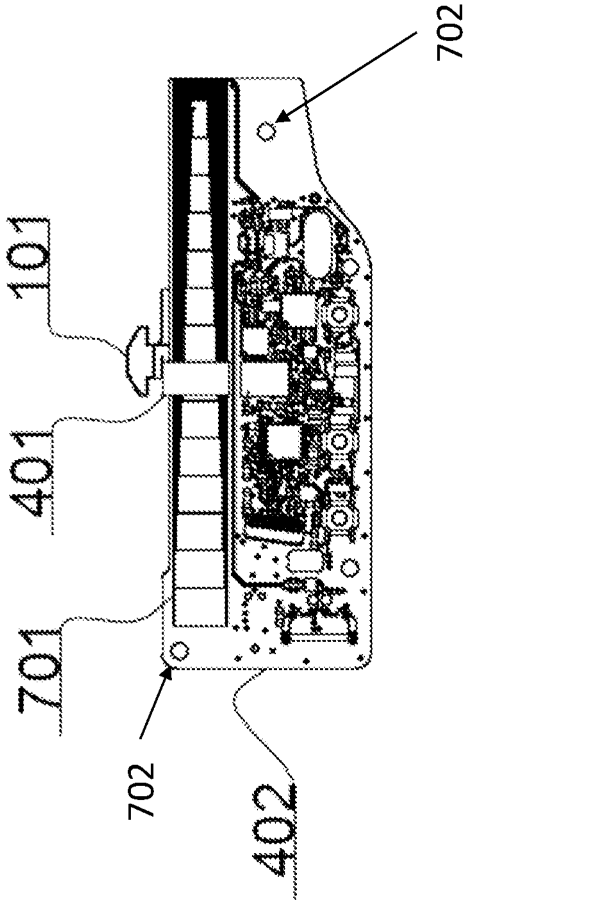
FIGS. 7*a* and 7*b* are diagrams of an embodiment of a PCB and a stretch coil according to the present teachings.

Referring now to FIG. 7*a* depicted is an embodiment of the PCB 402 and measuring device 1 according to the present teachings.

The PCB 402 may have at least one hole 702 for connecting the PCB 402 with device housing 100. The PCB 402 may be connected to the housing 100 using any suitable fastening method, including, but are not limited to, screws, rivets, clamps, and custom mounting brackets.

Figure 7B:
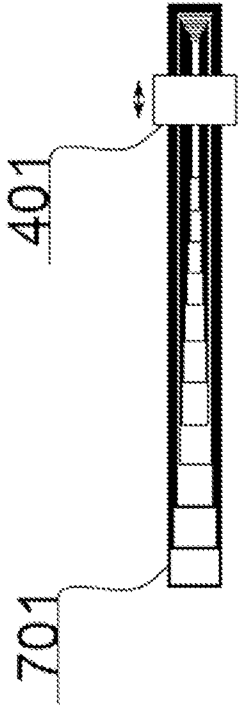

Referring now to FIGS. 7*a* and 7*b* depicted is a detailed view of an embodiment of the stretch coil 701 according to the present teachings.

In an embodiment, the PCB 402 may include a stretch coil 701 for inductance measuring. The stretch coil 701 layout may take any form along the PCB 402 such that a linear bar 401, which may be constructed of conductive material or otherwise have a conductive material attached, moves over a stretch coil 701 while an alternating electric current is flowing through said stretch coil 701, the movement of said linear bar 401 changes the magnetic field produced by said stretch coil 701. The position of the linear bar 401 via thumb slider 101 may be moved along the stretch coil 701 changing the magnetic field of the stretch coil. The linear bar 401 may be of size and position to extend past the stretch coil 701 on both sides parallel to the axis of movement. The length of the linear bar 401 in the direction parallel to the axis of movement may be as large as possible without constraining the travel distance beyond the requirement of the measuring device 1. The distance between the planar surface of the linear bar 401 closest to the stretch coil 701 and the stretch coil 701 surface is kept consistent throughout the length of travel, at 3 millimeters or less, such that resolution of the measured distance is maximized. The measuring device 1 may measure the changes in the magnetic field, or the effects thereof, of the stretch coil 701 to determine the changes in the position of the jaws 103, 104, 111, 112 and/or the arm 108 to measure, for example as shown in FIG. 1*b*.

The stretch coil 701 may be made up of multiple overlapping coil loops. The overlapping coil loops may be in a substantially conical shape such that there is a higher density of coil loops on one end of the stretch coil 701. Additionally, the coil loops may be present on multiple layers of the PCB 402 in order to increase the overall inductance of the system. An alternating electric current may run through the coil loops creating a different magnetic field along the length of the stretch coil 701. As the linear bar 401 moves along the stretch coil 701 the linear bar 401 may interact with said magnetic field by way of induced current flow. In present teachings the induced current on the linear bar 401 is determined by the alternating magnetic field strength at the position of the linear bar 401 relative to the stretch coil 701. The induced current on the linear bar 401 may generate its own alternating magnetic field which opposes the field generated by the stretch coil 701.

In an embodiment, the PCB 402 may contain a circuit to drive and measure the resonant frequency of the stretch coil 701. The resonant frequency of the stretch coil 701 is modified by the inductance changes which occur as the linear bar 401 moves along the stretch coil 701, through the magnetic field. In an embodiment, an inductance to digital converter may convert the stretch coil 701 frequency to a digital value for further interpretation by a microcontroller or other computing device.

In an embodiment, the stretch coil 701 may be driven at frequencies between 1 kHz and 10 MHz, which may be tuned by selecting appropriate inductor and capacitor values for an L-C tank oscillator. A particular frequency may be calculated by using the equation $$f_{SENSOR}(H_Z) = \frac{1}{2\pi\sqrt{LC}}$$

where L is the inductor value and C is the capacitor value.

In one embodiment, the inductance to digital converter may utilize a precise reference oscillator to measure the frequency of the stretch coil 701. In a preferred embodiment, a reference frequency as high as 40 MHz may be used in order to provide maximum sample rate. In further preferred embodiment, an inductance to digital converter output resolution may be optimized when the driven frequency of the stretch coil 701 and the reference frequency may be at a ratio of 0.025 whereby $$\frac{f_{STretchCoil}}{f_{Reference}} = 0.025.$$

Figure 8A:
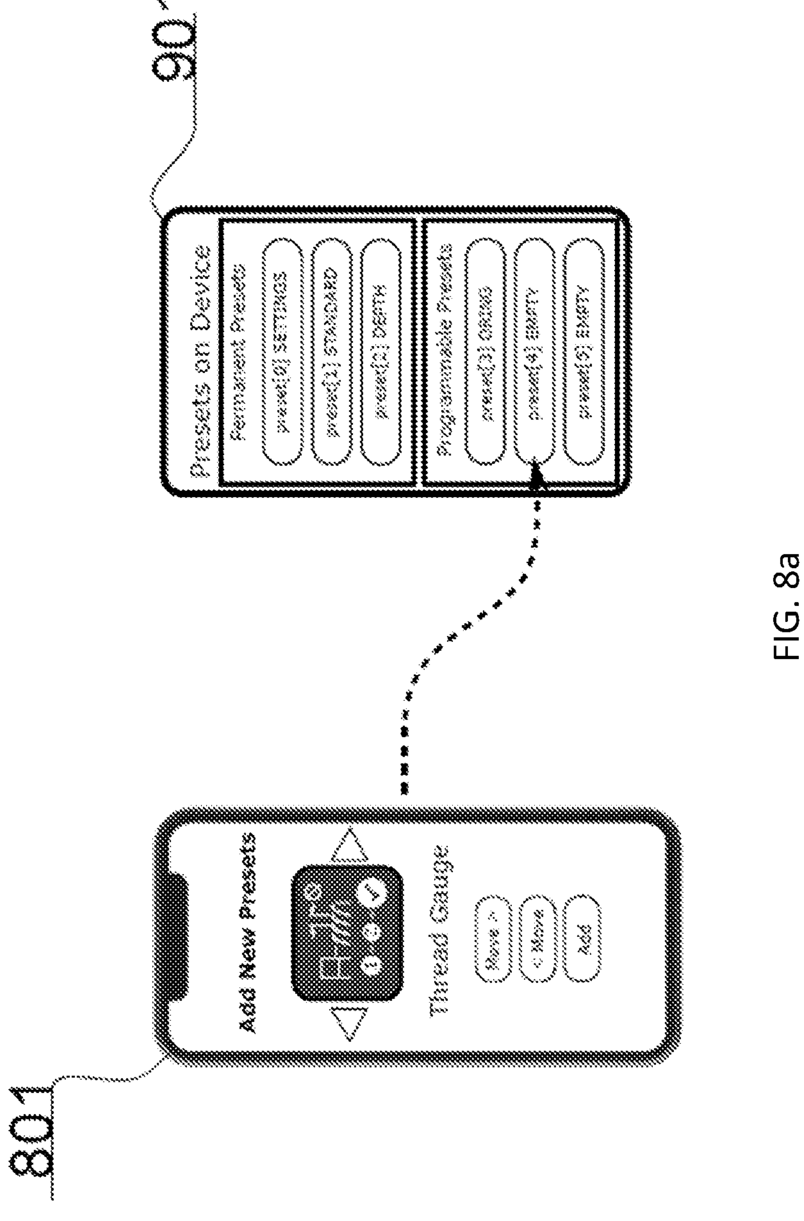
FIGS. 8*a-c* are diagrams of an embodiment of preset measurement programs as installed on the measuring device, and a specific embodiment of a preset to demonstrate a screw size gauge, respectively.
Figure 8B:
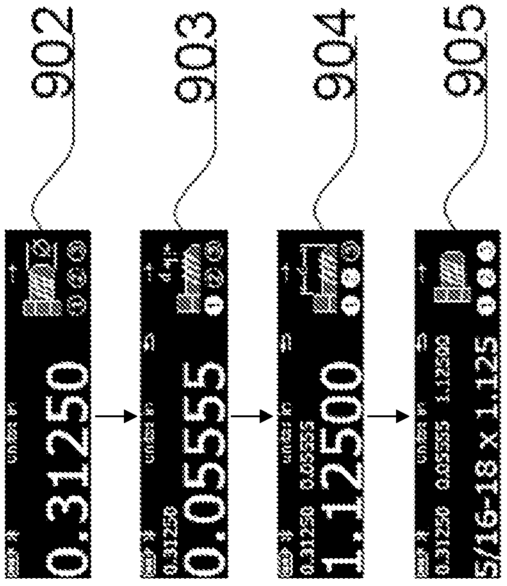
Figure 8C:
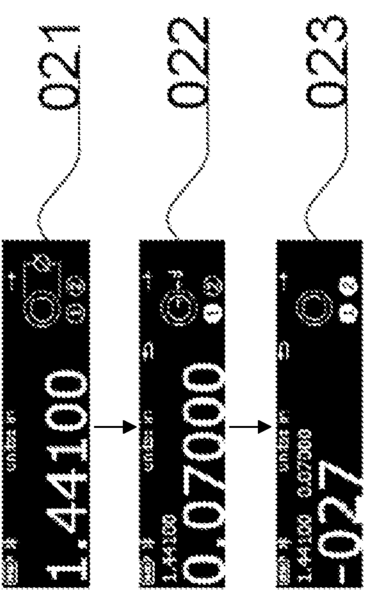

Referring now to FIGS. 8*a-c*, depicted are diagrams which demonstrate presets which may be programmed onto the measuring device 1. In the following depictions, a preset may be any programmed object, thread, function, or other self-contained subset of code which performs a specific function.

FIG. 8*a* depicts a diagram demonstrating one embodiment of the programmable feature of the measuring device 1 according to the present teachings. A preset may be added, removed, or reordered within the main program of the measuring device 1 as depicted in the example device preset organization 901. The presets programmed on the measuring device may be modified with any communication protocol, including but not limited to USB, Bluetooth, or wireless.

FIG. 8*b* is a depiction of embodiments of a preset as interacted with on the measuring device 1. The preset in the depicted embodiment demonstrates prompted measurements, as displayed on the graphical display 102. The preset may prompt one or a succession of measurements and calculate and display a calculated or formatted depiction of the measured values. Depicted in the figure are the succession of measurements taken to calculate a specific screw size, eliminating the need for external references material to calculate a correlation between these measurements and a specific standard screw size. It is understood that the preset depicted here is only one embodiment and any alternative preset functionality may be designed and programmed onto the measuring device 1.

The thread gauge screens in the depicted preset may follow the following succession of events. The first preset screen 902 displays an icon to instruct the user to measure the major diameter of the screw. The user may use the inner jaws 111, 112 or outer jaws 103, 104 to take this measurement, and subsequent measurements taken within this preset program. The user may press the input buttons 106 or the programmable multi-function button 405 to enter a measurement. The thread gauge preset may then proceed to the second preset screen 903, whereby the user is instructed to measure the pitch of the screw thread and enter the measurement to the preset using the input buttons 106 or the programmable multi-function button 405. The thread gauge preset may then proceed to the third preset screen 904, whereby the user is instructed to measure the length of the screw and enter as described above. The measuring device 1 may then use the provided measurements to compute or lookup the nearest standard fastener size. The thread gauge preset may then proceed to the fourth preset screen 905, where the nearest standard fastener size information may be presented to the user.

FIG. 8*c* is an alternate depiction of embodiments of a preset as interacted with on the measuring device 1. The preset in the depicted embodiment demonstrates prompted measurements, as displayed on the graphical display 102. The preset may prompt one or a succession of measurements and calculate and display a calculated or formatted depiction of the measured values. Depicted in the figure are the succession of measurements taken to calculate a specific O-ring size, eliminating the need for external references material to calculate a correlation between these measurements and a specific standard O-ring size.

The O-ring size screens in the depicted preset may follow the following succession of events. The first preset screen 021 displays an icon to instruct the user to measure the outer diameter of the O-ring. The user may use the inner jaws 111, 112 or outer jaws 103, 104 to take this measurement, and subsequent measurements taken within this preset program. The user may press the input buttons 106 or the programmable multi-function button 405 to enter a measurement. The O-ring size preset may then proceed to the second preset screen 022, whereby the user is instructed to measure the thickness or difference from the inner and outer diameter of the O-ring and enter the measurement to the preset using the input buttons 106 or the programmable multi-function button 405. The measuring device 1 may then use the provided measurements to compute or lookup the nearest standard O-ring size. The O-ring size preset may then proceed to the third preset screen 023, where the nearest standard O-ring size information may be presented to the user.

The measuring device 1 may also have the ability to communicate with one or more external device(s) 801. The external device 801 may be a smart phone, laptop, desktop, smart watch, or other computing device capable of receiving data. The measuring device 1 may communicate with the external device 801 via Bluetooth, Wi-Fi, USB, or any other wireless or wired connection capable of transmitting data. The measuring device 1 may transmit or receive measurement data, user information, firmware or software updates, or any other data.

In an embodiment the external device 801 may act as the graphical display 102. The external device 701 may mirror the graphical display 102, may be in place of the graphical display 102, or may display alternative units or measurements from the graphical display 102. The external device 801 may receive or transmit data from the measuring device 1 in real time or in single packets with or without termination characters as is typical in the Human Interface Device "HID" standard, or similar protocols.

In another embodiment the programmable multi-function button 405 and/or the input buttons 106 may be used to interact with the external device 801. For example, the programmable multi-function button 405 and/or the input buttons 106 may prompt the sending/receiving of data to/from the external device, switch the display, change the units, save/erase a measurement, or perform other functions of known calipers.

In an embodiment of the measuring device 1, the external device 801 may be used to create schematic measurements of an object being measured by the measuring device 1 in real time. The external device 801 may receive an image of an object 803. The image of the object 803 may be sent to the external device 801 or the external device may include a camera and capture the image of the object 803 itself. The user may manually add blank dimensions 805 to the image of the object 803 or the device may detect and automatically add blank dimensions 805. The user may use the programmable multi-function button 405, the input buttons 106, and/or the external device 801 to select a blank dimension 805 and use the appropriate portion of the measuring device 1, i.e., inside jaws 111, 112, outside jaws 103, 104, depth gauge, or any other measuring interface, to measure the actual object 803. Once the measurement is taken, the programmable multi-function button 405, the input buttons 106, and/or the external device 801 may be used to save the measurement to the blank dimension 805 making it a filled dimension 807. In an embodiment, the measuring device 1 and external device 801 automatically communicate to automatically change blank dimensions 705 to filled dimension 807 in real time as the user measures the respective parts of an object. Filled dimensions 807 may be overwritten or deleted using the programmable multi-function button 405 and/or the input buttons 106. The measurement data may be mapped and saved directly to the image of the object 803.

Figure 9:
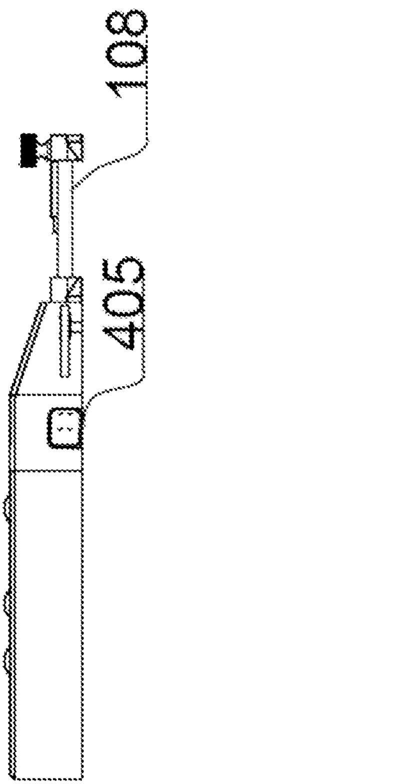
FIG. 9 is a side profile diagram view of an embodiment of a device according to the present teachings.
Figure 10:
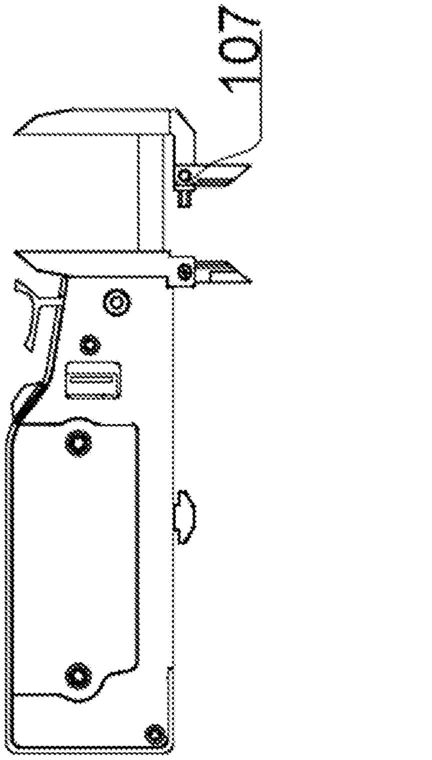
FIG. 10 is a back profile diagram view of an embodiment of a device according to the present teachings.

Referring now to FIGS. 9 and 10, shown are a side and back profile view diagrams of the measuring device 1 according to the present teachings.

In one embodiment the measuring device 1 may have a flat bottom profile and a chamfered or angled top profile. This may provide hand support, ergonomic support, or a better grip of the device.

In one embodiment the measuring device 1 may have screw holes on the back of the housing 100. These screw holes may line up with the holes 702 in the PCB 402 and/or may be additional screw holes to hold other components in the device together. The measuring device 1 may also have a removable back panel. The back panel may provide access to the inside of the device and/or a battery. The battery may be removable. The battery may be rechargeable or disposable.

Figure 11:
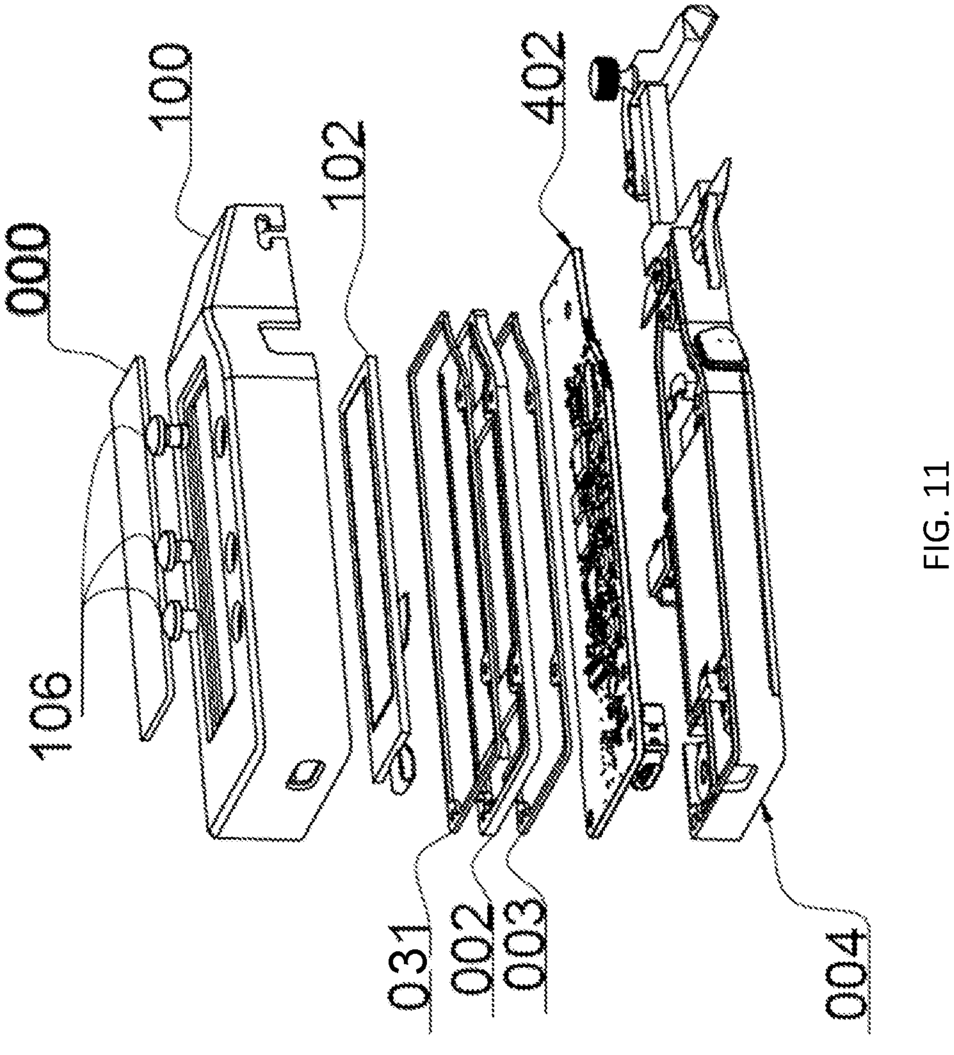
FIG. 11 is an exploded diagram view of an embodiment of a device according to the present teachings.

Referring now to FIG. 11 shown is an exploded diagram view of the different layers and components of the measuring device 1 according to the present teachings.

In one embodiment the measuring device 1 may have a protective glass 000 inlaid the housing 100 covering the graphic display 102. The protective glass 000 may be transparent, translucent, partially transparent, or tinted, provided the graphic display 102 is visible through the protective glass 000.

The measuring device 1 may also include a seal plate 002. The seal plate 002 may provide a surface seal around the PCB 402 and/or the graphic display 102. The seal plate 002 may include one or more gaskets 031, 003 above and/or below the seal plate. The gaskets 031, 003 may provide water and dust ingress protection.

The measuring device 1 may also include a lower subassembly 004. The lower subassembly 004 may house a battery or fuel source to power the device, the programmable multi-function button 405, a spring force, the arm 108, or other components of the measuring device 1. The PCB 402 may be inlaid, on top of, or connected to the lower subassembly 004.

Figure 12:
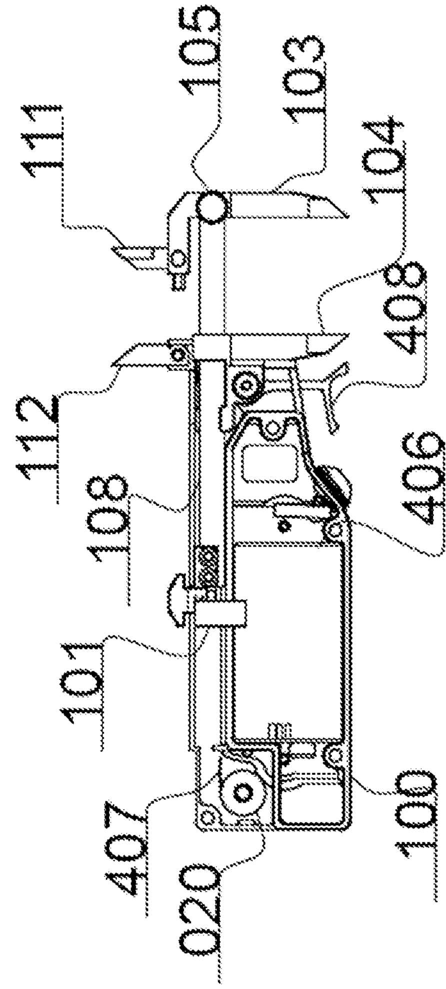
FIG. 12 is a top-down diagram view of the lower assembly according to the present teachings.

Referring now to FIG. 12 shown is a top down view of the lower subassembly 004 according to the present teachings.

In one embodiment, FIG. 12 shows the various internal components which may be installed in the lower subassembly 004. For example the lower subassembly 004 may include a drum 020 which the spring 407, connected to the arm 108, is wound around. The drum 020 which the spring 407 is wound around may be a coil spring, a drum spring, or other type of spring and may apply a constant retracting force which biases the jaws of the device to be in a closed position by default.

Figure 13:
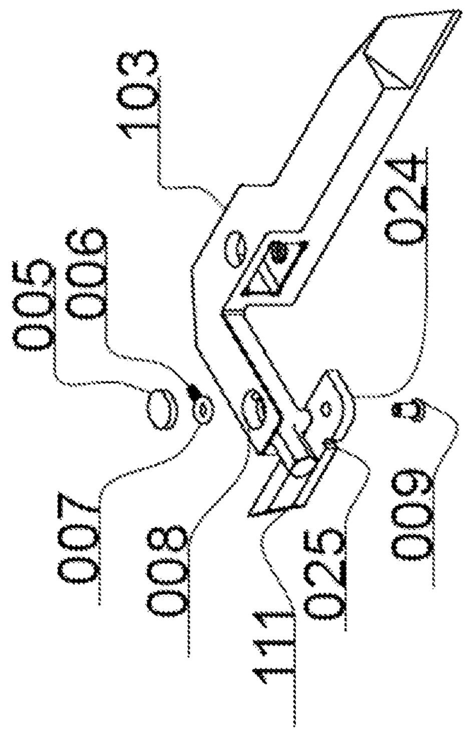
FIG. 13 is an exploded diagram view of the upper jaws according to the present teachings.

Referring now to FIG. 13 shown is an exploded diagram view of the upper jaws 103, 111 according to the present teachings.

In one embodiment the jaws are connected via a pin 009. The pin 009 passes through a hole in the upper inner jaw 111 and the hinge slot 008. This may allow the upper inner jaw 111 to rotate between the storage position 301 and the measuring position 303. A retention ring 007 including a spring 006 may be inlaid the hinge slot 008. The spring 006 may apply a constant force the inner jaw 111 to hold the inner jaw 111 against the shield of the outer jaw 103. The pin 009 may pass through the retention ring 007 in the hinge slot 008. The pin 009 may become permanently fixed to the retention ring 007 by press fit or other process during assembly; this may prevent the jaws 103, 111 from separating from each other. A press fit hinge seal cap 005 may be pressed into the jaw assembly in the hinge slot 008 to protect against debris.

While FIG. 13 exemplifies the upper jaw assembly it is understood that a similar assembly may be present in the lower jaws. The hinge assembly for both inner jaws is intended to provide repeatable and accurate measurement surfaces orthogonal to the arm 108.

A further example of the assemblies constructions and operation is provided herein. A spring 006 is inserted into a hole in the hinge slot 008 protruding orthogonally to the counterbore wall of the hinge slot 008 such that part of it sticks out when fully extended, but can be compressed into a hole in the hinge slot 008.

Pin 009 is press fit through a hole in the inner jaw 111. The pin 009 may be long enough to protrude through the hole in the inner jaw 111. The protruding length of 009 is passed through the hinge slot 008, and a retention ring 007 is press-fit onto the end of the pin 009. The fit is such that the pin 009 can slide in one dimension within the slot. As the pin 009, inner jaw 111, and retention ring 007 slide in the hinge slot 008, spring 006 is compressed at one end, applying force to bias the assembly towards the jaw shelf 107 of the upper outer jaw 103.

The inner jaw 111 may have a cam shape in one rounded corner 024 which is in contact with the jaw shelf 107 throughout the rotation. The cam causes the hinge assembly to push against the spring during the rotation, with the highest force during angles between 0 degrees and 90 degrees with respect to the arm 108. This acts in a similar way to a detent, whereby the inner jaw is in a more stable position at 0 degrees and 90 degrees, which are the two positions used for storage and measuring.

The upper and lower shelves 107 and 113 may include a right-angle portion to prevent over-rotation. This is accomplished by a notch 025 in the inner jaws 111 and 112. When the jaws are fully rotated out, they are stopped by the shelves. It is the combination of the right-angle portion and the precision fit of the jaw assembly which prevents over-rotation and ensures the jaw remains orthogonal to the arm 108.

The inner jaws can be made to tight parallel tolerances with the outside jaws by precision grinding the surfaces after the inner jaws have already been assembled onto the outside jaws, and using either the outside jaw measuring surface as a reference plane or referencing off of the perpendicular guide surfaces which the arm 108 is aligned to.

Figure 14:
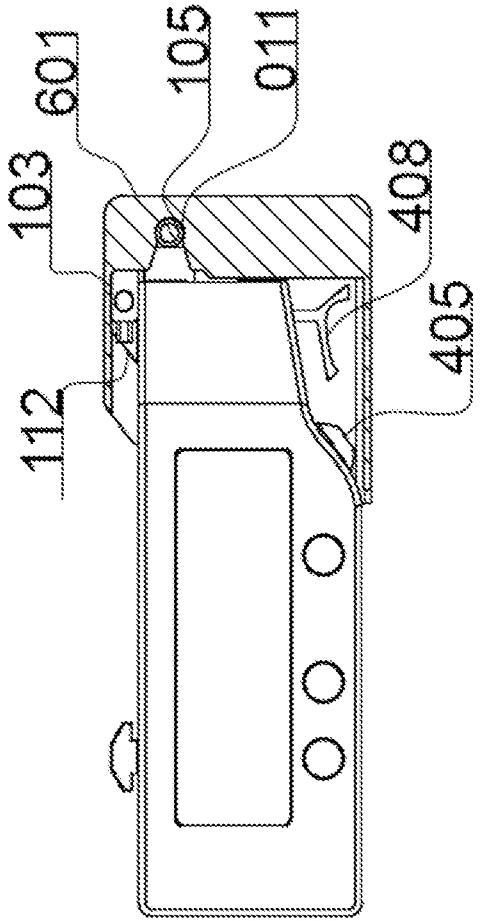
FIG. 14 is a cross section view of the end cap on an embodiment of the device according to the present teachings.

Referring now to FIG. 14 shown is a cross section of the end cap 601 over the measuring device 1.

In one configuration the end cap 601 may cover one end of the measuring device 1 including the programmable multi-function button 405, the cam lever 408, the jaws, 103, 104, 111, 112 and associated parts. The end cap 601 may have a shaped slot 011. The shaped slot 011 may snap around the thumb screw 105 creating a secure connection so the end cap 601 does not fall off. The shaped slot 011 may have an angled inlet with one end wider than the thumb screw 105 and one end narrower than the thumb screw 105 such that when pressure is applied the thumb screw 105 removably snaps into the shaped slot 011. The shaped slot 011 may be exposed or may be enclosed within the end cap 601.

Figure 15:
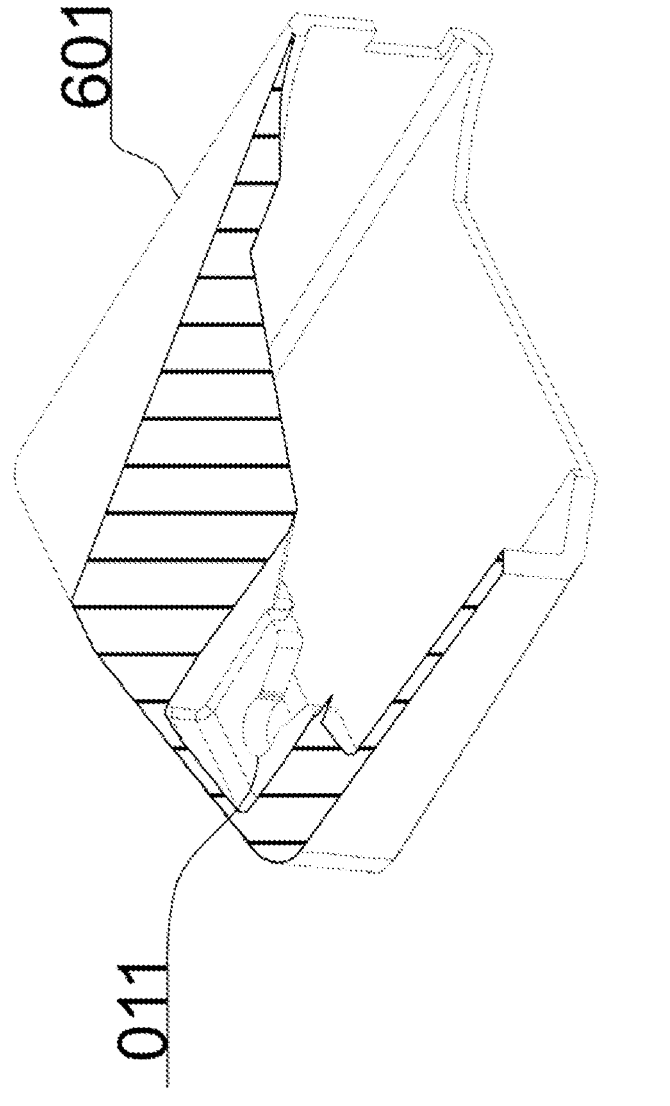
FIG. 15 is a diagram view of the end cap according to the present teachings.

Referring now to FIG. 15 shown is another cross section view of the end cap 601 according to the present teachings. A portion of the end cap 601 is cut away to reveal the shaped slot 011 which is inside or imbedded in the end cap 601. In this embodiment the shaped slot 011 does not interfere with the outer geometry of the end cap 601 which may be preferable to provide hand support or an ergonomic grip. This may be particularly true in the configuration where the end cap 601 acts as a handle extension of the measuring device 1.

In one embodiment the end cap 601 may be made of a pliable or semi-pliable material. The end cap 601 may be made of a deformable material that will substantially retain its shape. For example, the shaped slot 011 may deform to snap to the thumb screw 105 and/or edges of the end cap 601 may deform to form a fitted seal around either end of the housing 100.

Figure 16:
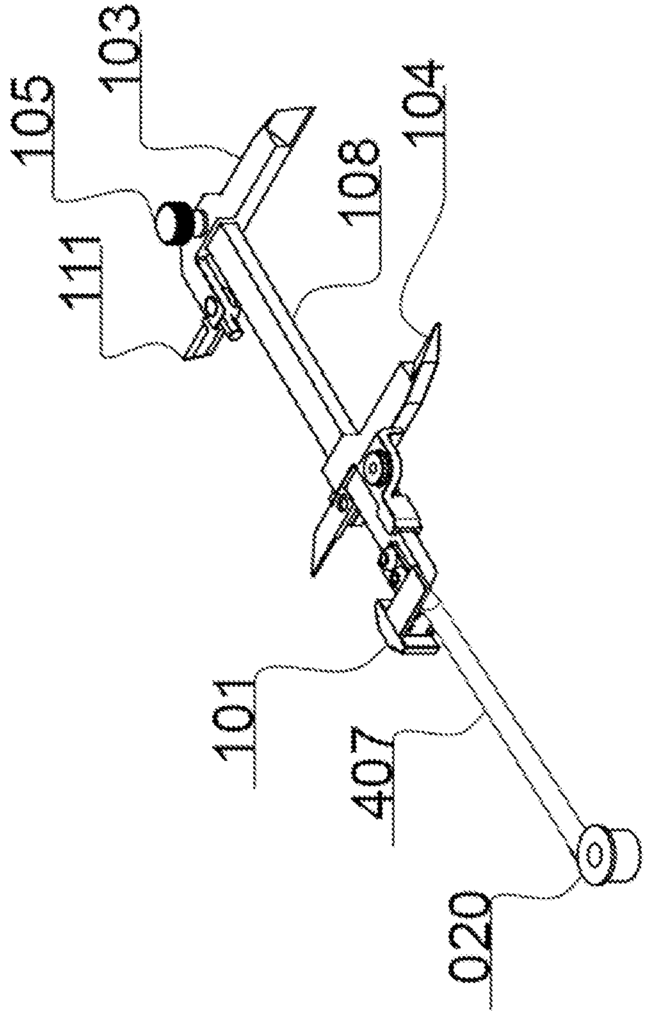
FIG. 16 is an isolated diagram view of the measuring jaws and bias spring according to the present teachings.

Referring now to FIG. 16 shown is an isolated diagram view of the spring mechanism and the arm 108.

In one embodiment the measuring device 1 rests in the closed position, which may prevent damage and increase portability of the device. The spring 407 wound around the drum 020 may be attached to the arm 108 by one or more screws, welds, glue, or other means of attachment. The spring 407 may apply a force that is the same along the full measurement range and across all measurements and users. This reduces variability caused by a user applying varying forces while taking a measurement.

Figure 17:
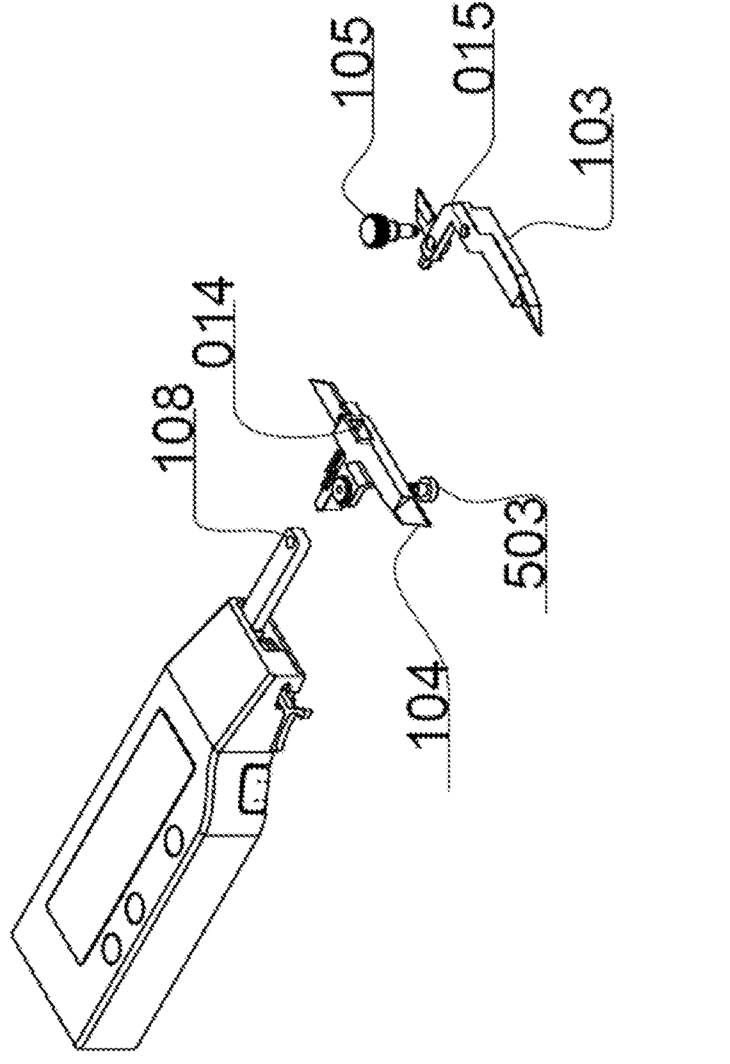
FIG. 17 is a disassembled diagram view of the measuring jaws and device according to the present teachings.

Referring now to FIG. 17 shown is a partially disassembled view of the measuring device according to the present teachings.

In one embodiment the measuring device includes removable upper and lower jaws. The lower jaws may include a precision machined hole 014 which the arm 108 passes through. In this way, the upper and lower jaws, and the component piece thereof, may be easily removed to allow for the replacement of damaged measuring surfaces. The measuring components (e.g., jaws) may also be replaced with different materials, including but not limited to, non-sparking, high hardness, soft non-marring, or non-conductive materials. The measuring components (e.g., jaws) may also be replaced with alternative types of measuring surfaces and attachments, including but not limited to conical (circle center-to-center), offset, radius, deep jaw, or indicator attachment measuring components.

Figure 18:
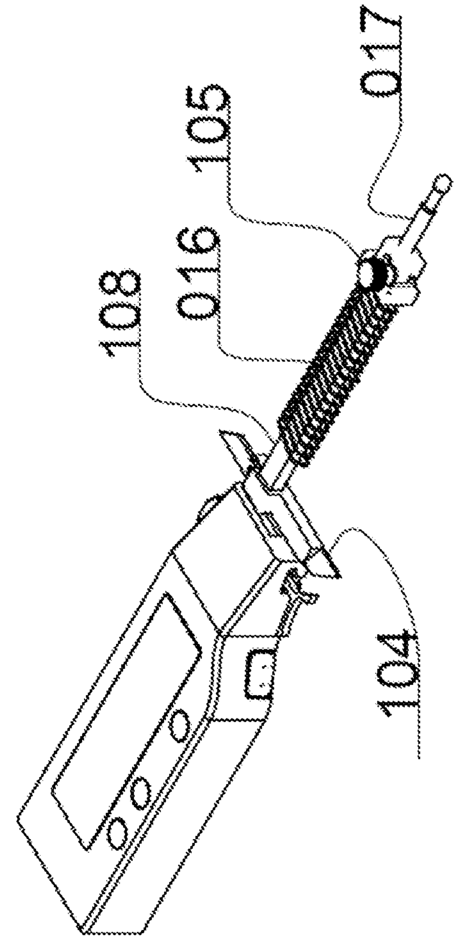
FIG. 18 is a diagram view of an alternate embodiment of the device according to the present teachings.
Figure 20:
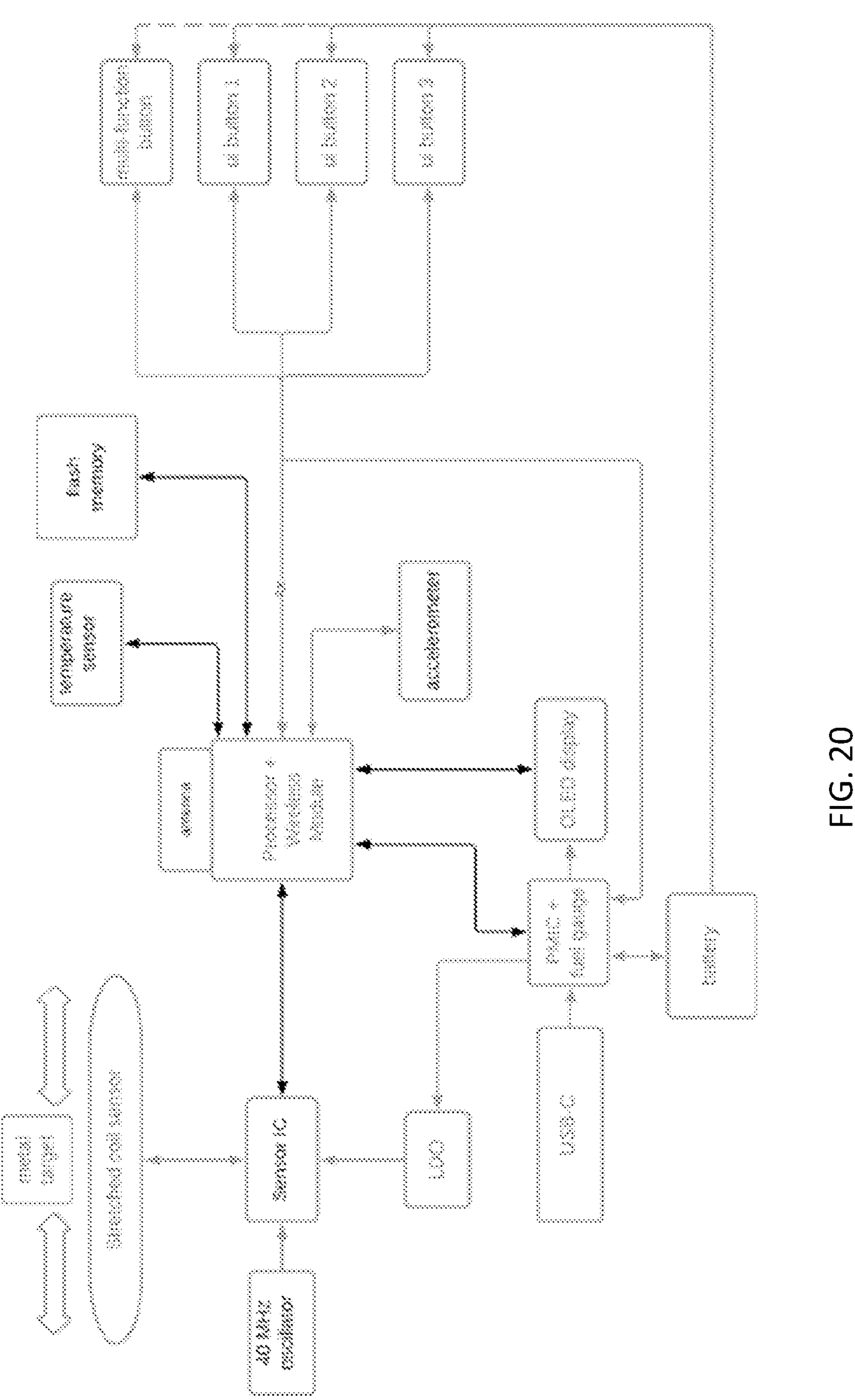
FIG. 20 is an embodiment of a high-level system diagram of the measuring device according to the present teachings.

Referring now to FIG. 18 shown is alternate measuring attachment according to the present teachings.

In one embodiment the measuring device 1 may have an alternative attachment installed. Measuring device may function as a linear indicator, which allows for expanded measuring applications. This may be achieved by removing the upper jaw assembly and installing a measurement spring 016 over the arm 108. A probe tip 017 attachment may be installed in place of the upper jaw assembly. The measurement spring 016 may provide enough force to be greater than the force of the built-in constant force spring 407, and is applied in the opposite direction. Therefore, when installed, the indicator probe tip 017 attachment rests in the extended position and provides resistance to retracting towards the housing 100. Typical applications for this alternate measuring assembly include but are not limited to a height gauge, fixture alignment, and chuck centering on a lathe.

Referring now to FIG. 19 shown is a cross section view of the upper jaw assembly and the thumb screw 105.

In one embodiment the thumb screw 105 may be a precision threaded pin with a knurled and flared head. The precision pin portion 019 of the thumb screw 105 may be installed through a precision hole in the arm 108 which provides positional alignment between the arm 108 and the upper jaw assembly. This ensures that the jaws can be repeatedly removed and reinstalled while maintaining repeatable alignment of the measuring surfaces.

In a preferred embodiment only the end portion of the thumb screw 105 is threaded 018 to attach to the upper outside jaw 103. In this way the threads to not cause wear on the arm 108 and the alignment of the jaws and the arm 108 is better maintained over time.

Referring now to FIG. 21, shown is an embodiment of a high-level system diagram of the measuring device 1 according to the present teachings.

For example, in an embodiment, the wireless SoM "System on Module" may be the central computer of the measuring device 1, sending and receiving the different measurement data. In one embodiment the SoM may be a nRF52 module. It is understood that while a SoM is used in the present embodiment, any other processor type may be used, including a microcontroller, a SoC "System on Chip", an embedded computer, or any other processor. The wireless SoM may have an antenna for Bluetooth or wireless connectivity. The wireless SoM may also have or communicate with flash memory to temporarily or permanently store measurement data, calibration data, or firmware. The wireless SoM may also include or communicate with an accelerometer.

The wireless SoM may connect to an LDC sensor which may include the stretch coil 701 as described above. A 40 MHz oscillator (it is understood that 40 MHz is by way of example and the oscillator may be any frequency) may connect to the LDC and the stretch coil 701 to induce an electrical current. The metal target may be the linear bar 401 as described above. As the metal target moves along the stretch coil 701, the LDC sensor may detect a change/different magnetic field and the wireless SoM may receive this information.

The device may also have a battery which may be the same as the battery 406 as described above. The battery may power the entire device. A PMIC+fuel gauge may be connected to a USB-C port. The USB-C port may be the same as the port 202 as described above. A charger may plug into the USB-C port and charge the battery via the PMIC+fuel gauge. The PMIC+fuel gauge may also send information regarding the battery, e.g., power level, to the wireless SoM and/or the OLED display. The OLED display may be the same as the graphical display 102 as described above.

The device may also have controls including a multi-function button and one or more ui "user interface" buttons to control different functions on the measuring device 1. The multi-function button may be the programmable multi-function button 405 as described above. The ui buttons may be the input buttons 106 as described above. The controls may provide functions on the measuring device 1 and/or control functions on an external device connected to the measuring device 1 via Bluetooth or other wireless connectivity.

The device may also include a temperature sensor. The temperature sensor may be an independent sensor to allow the measuring device 1 to measure and display the temperature. In one embodiment the temperature sensor may allow for calibration of the device at multiple temperatures. Some internal systems may behave differently at either end of the compatible temperature range, which may affect the measurement accuracy. The temperature sensor can be used to compensate for extreme temperatures, hot or cold, at either end of the compatible temperature range.

The device may also include an accelerometer. The accelerometer may be an independent sensor to allow the measuring device 1 to measure and display the acceleration of the device. In one embodiment the accelerometer may be used to detect the orientation of the measurement device so that the OLED display can automatically rotate for the user's convenience.

What is claimed is:

1. A measuring device comprising:

a housing having an opening;

a first jaw removably attached to the housing;

an arm slidably extending through the opening of said housing adjacent said first jaw;

a second jaw removably attached to said slidable arm for movement toward and away from said first jaw; and an electronic sensor calibrated to measure a position of the arm;

wherein a distance between the first jaw and the second jaw is determined based on the position of the arm, wherein the first jaw includes a channel through which the arm passes, the channel constraining the arm to a linear axis of motion such that orthogonality between the arm and the first jaw is independent of the housing.

2. The measuring device of claim 1 including a display attached to the housing for depicting the distance.

3. The measuring device of claim 1 wherein inner edges of said first and second jaws are used to take measurements.

4. The measuring device of claim 1 further comprising third and fourth jaws for respectively replacing the first and second jaws.

5. The measuring device of claim 4 wherein said electronic sensor is recalibrated for use of said third and fourth jaws.

6. The measuring device of claim 4 wherein outer edges of said third and fourth jaws are used to take measurement on their outer edges.

7. The measuring device of claim 1 further comprising a probe for replacing the second jaw;

wherein a distance between the first jaw and the probe is determined based on the position of the arm.

8. The measuring device of claim 7 wherein an inner edge of said first jaw and the probe are used to take measurements.

9. The measuring device of claim 1 further comprising a spring mounted within said housing for biasing said arm into said housing.

10. The measuring device of claim 9 further comprising a thumb-operated slider for advancing said arm against bias of said spring to slide said arm and second jaw away from said housing.

11. The measuring device of claim 10 further comprising a cam operating against said arm to hold said arm in a fixed position against action of said spring to take a measurement of the distance.

12. The measuring device of claim 11 wherein said cam is a finger-operated trigger.

13. The measuring device of claim 9 wherein the spring provides a constant force on said arm regardless of position of said arm, and wherein the spring is configured to provide a substantially uniform inward bias force across an operational stroke of the arm, the inward bias maintaining a substantially consistent measuring force regardless of arm extension.

14. The device of claim 1 wherein said electronic sensor is a coil adjacent to the arm; and a current running through the coil;

wherein the arm is conductive;

wherein as the arm slides, inductance in the coil changes and the position of the arm is determined based on the change in inductance, and wherein the coil is fixed relative to the housing and the conductive arm moves relative to the coil.

15. The device of claim 1 wherein the first jaw comprises a lower inner jaw and a lower outer jaw and the second jaw comprises an upper inner jaw and an upper outer jaw;

wherein the lower outer jaw and the lower inner jaw are perpendicular to the arm;

wherein the lower inner jaw and upper inner jaw are rotatable between a measuring position and a storage position, the lower inner jaw and upper inner jaw are perpendicular to the arm in the measuring position and the lower inner jaw and upper inner jaw are parallel to the arm in the storage position, and wherein the rotatable lower inner jaw and upper inner jaw include defined stop surfaces configured to establish a perpendicular measuring orientation.

* * * * *